United States Patent [19]

Kyminas et al.

[11] Patent Number: 4,859,723

[45] Date of Patent: Aug. 22, 1989

[54] COATING FOR ROOF SURFACES

[75] Inventors: Stanley C. Kyminas; John C. Phillips, both of St. Petersburg; Bernard J. Einhaus, Clearwater, all of Fla.

[73] Assignee: The Celotex Corporation, Tampa, Fla.

[21] Appl. No.: 190,554

[22] Filed: May 5, 1988

Related U.S. Application Data

[63] Continuation of Ser. No. 851,769, Apr. 14, 1986, Pat. No. 4,749,731.

[51] Int. Cl.[4] .......................... C08K 3/28; C08K 7/20
[52] U.S. Cl. ........................................ 524/31; 524/42; 524/425; 524/440; 524/442; 524/445; 524/447; 427/258; 427/385.5; 428/146; 428/147; 428/150
[58] Field of Search ................ 524/31, 428, 440, 442, 524/445, 447, 42; 106/169, 180, 193 R, 193 J, 193 P; 427/256, 258, 385.5; 428/147, 150, 146

[56] References Cited

U.S. PATENT DOCUMENTS

| | | | |
|---|---|---|---|
| 2,666,719 | 1/1954 | Lissant | 117/132 |
| 2,892,804 | 6/1959 | Crissey | 524/445 |
| 4,146,672 | 3/1979 | Jasperson | 428/337 |
| 4,222,924 | 9/1980 | Schumacher | 524/445 |
| 4,311,635 | 1/1982 | Pearson | 524/442 |
| 4,390,570 | 6/1983 | Rehberg | 427/383.5 |
| 4,442,242 | 4/1984 | Fogelberg | 523/200 |
| 4,478,970 | 10/1984 | Abolins et al. | 524/125 |
| 4,483,958 | 11/1984 | Kosaka et al. | 524/409 |
| 4,571,415 | 2/1986 | Jordan, Jr. | 524/428 |

OTHER PUBLICATIONS

Elastomeric Roof Mastics, Rhoplex EC-1895 Acrylic, Product Bulletin, Rohm and Haas Company.
Haloflex Latices, Vinyl Acrylic Copolymers for Waterborne coating from ICI Americas Inc., Product Bulletin.
Dahl, Mike, "Properties for Roofing", Roofing/Siding/Insulation, Feb. 1985.

Primary Examiner—John Kight
Assistant Examiner—Nathan M. Nutter
Attorney, Agent, or Firm—James W. Grace; Charles W. Vanecek

[57] ABSTRACT

A process of forming a durable waterproof coating on a substrate comprising (a) applying to the surface of the substrate an aqueous dispersion comprising at least one film-forming polymer, pigment material including clay in an amount sufficient to improve the adhesion of the coating to the substrate, and water, the pigment volume concentration of the dispersion being greater than 15, and (b) allowing the dispersion to dry on the surface.

20 Claims, No Drawings

4,859,723

COATING FOR ROOF SURFACES

This is a continuation of application Ser. No. 851,769, filed Apr. 14, 1986, now U.S. Pat. No. 4,749,731.

BACKGROUND OF THE INVENTION

1. Field of the Invention

This invention relates to coating materials and processes and more particularly to the protection of roof surfaces with coatings which are highly adherent to these surfaces, and resistant to water ponding and long-term weathering. The coatings additionally may be formulated to have excellent flame retardancy.

2. Description of the Prior Art

The use of built-up asphalt, known as "BUR" in the building industry, has been the standard system for covering flat and gently pitched roofs in the United States for well over a century. The asphalts used in this system are dispersions of asphaltenes (heavy molecular weight) and maltenes (resins and oils). Weather oxidizes and hardens asphalts, destabilizing the oils in the maltene fraction and causing them to "sweat" to the surface. Loss of oils reduces the flexibility of the roof membrane and causes the BUR surface to crack under the sun.

Roof coatings seal the BUR membrane, preventing loss of oils and preserving the needed flexibility. White roof coatings additionally provide high reflectance which reduces thermal shock movement and membrane fatigue. The presence of protective roof coatings also eliminates or greatly reduces the need for dead load gravel which can eventually cause roof assembly deflection.

Coatings of the present state of the art have not been entirely successful. A particular problem results from loss of adhesion to roof substrates, particularly hot-mopped asphalt, after areas of the roof have been under water for prolonged periods of time. Without adhesion to the wet areas, the protective film eventually blisters away from the substrate, leaving the surface without protection.

OBJECTS OF THE INVENTION

It is therefore an object of the present invention to provide an improved coating, especially for roofs, which is characterized by excellent adhesion to the substrate, and resistance to water ponding and long-term weathering.

It is another object of the present invention to provide a fire-retardant coating, which would qualify for a high fire classification rating, and thus furnish good protection in roofing applications.

It is a further object of the present invention to provide a coating which reflects sunlight and associated heat, and accordingly can reduce the thermal aging of roofs and contribute to cooler building interiors.

It is a still further object of the present invention to provide an improved method for coating a surface, which is particularly suitable for protecting various roof substrates and may even be performed on freshly applied hot-mopped asphalt.

These and other objects and advantages of the present invention will become apparent from this specification and the appended claims.

SUMMARY OF THE INVENTION

The above objects have been achieved through the development of a liquid coating composition, which on air drying yields an elastic and adherent coating for protecting exterior wall and roof surfaces. The roof coating of the invention is a flexible, tough and preferably white membrane that adheres well to various roof substrates and remains adhered even under severe water-ponding conditions. The coating is an aqueous composition broadly comprising a water-dispersible polymeric binder, pigment and filler material, including clay in an amount sufficient to improve the adhesion of the coating to a roof surface, and water. The clay is present in sufficient amount to increase the adhesion of the coating to above the adhesion it would have with the clay omitted. The composition has a PVC or pigment volume concentration greater than 15, and generally comprises about 10 to 40% by weight of polymeric binder, 20 to 60% by weight of pigment material (including clay) and 25 to 50% by weight of water.

In the broadest aspects of the present invention, the binding agent may be any film-forming polymeric resin that is compatible with the pigment material in the liquid dispersion medium and that has the flexibility to withstand the effects of long-term weathering. The binding agents include polyacrylic polymers, polyvinyl acetate polymers, polyvinyl chloride polymers, polyvinylidene chloride polymers, combinations thereof, etc. The polymers are frequently sold commercially as aqueous emulsions but some are also available as the solid polymer. The latter can be made into dispersions by anyone skilled in the art. In general, a satisfactory polymer is one having an average molecular weight of between about 10,000 and 10,000,000. Preferred binding agents are water-dispersible acrylic polymers, and copolymers of vinyl chloride, vinylidene chloride and acrylates. The Rhoplex EC acrylic emulsion polymers produced by Rohm and Haas Company and the Haloflex vinyl acrylic copolymer latices produced by ICI Americas Inc. are especially useful.

A wide variety of pigments or fillers can be employed in the coating of the invention. The pigments are suitably chosen so as to provide a highly reflective, white coating. Illustrative of the pigments (or fillers) which may be used are titanium dioxide, calcium carbonate, various clays, zinc oxide, alumina, silica, talc, mica, barium sulphate, alumina trihydrate, diatomaceous earth and mixtures thereof. The pigment material must contain sufficient clay to form a coating film which strongly adheres to a substrate even after prolonged water immersion. The coating composition is unlike and economically more attractive than the typical polymer-rich coatings of the prior art. It preferably has a pigment volume concentration (PVC) greater than about 20, more preferably greater than about 25, and most preferably greater than about 30.

The coating composition preferably includes a surfactant for increasing the wettability of the coating, thus allowing more rapid and intimate contact of the coating with the surface of the substrate. Any type of wetting agent may be used, which will reduce the surface tension of the water-based coating in which it is used without increasing water sensitivity of the coating. It has also been found advantageous to add a small quantity of a thickening agent. In addition to the foregoing ingredients, there are also desirably added to the coating composition other conventional coating ingredients such as defoamers, pigment dispersants, preservatives, etc.

The coating composition of the invention is conveniently brought to the application site in a premixed and ready-to-use condition. The composition may be applied quickly and easily in a fluid form by brush, roll or spray. It adheres strongly to a variety of roof substrates, e.g., asphalt, modified bitumen, urethane, steel, wood or cement. A great advantage of the coating is its capacity to be applied to asphalt which is still at a substantially elevated temperature after being mopped onto a roof at a temperature often in excess of 350° F. For example, the coating is advantageously applied to the hot asphalt surface as soon as the asphalt has set sufficiently for workmen to be able to walk on it. The time of application of the coating will depend on atmospheric conditions and may be as soon as 1 or 2 hours after the asphalt hot mopping. The water-based composition of the invention dries quickly to form a permanently elastic, protective coating. Due to its exceptional film integrity and flexibility and specially formulated reflectivity, the coating protects conventional bituminous built-up (BUR) roofs and other surfaces for long periods against degradation by sunlight and weathering, while at the same time it reduces interior summer temperatures, providing substantial energy savings. Additionally, the protective coating has an excellent appearance, which is of substantial aesthetic value.

DETAILED DESCRIPTION OF THE INVENTION

The present invention provides an aqueous coating composition which is adapted to air dry to form a water-resistant and permanently adherent coating. The composition may be used as a protective and decorative coating for a variety of surfaces, including wood, bituminous surfaces, metal and concrete, and is specially adapted to protect roof substrates with a coating having exceptional water resistance, reflectivity and durability.

The polymeric binding agent comprises water-dispersible homopolymers and copolymers whose average molecular weight is suitably at least about 10,000. The polymeric binder of the invention includes terpolymers and resin blends. The binder is advantageously incorporated into the coating composition in the form of a polymer latex, usually of about 45 to 65 percent solids, so that the amount of the latex solids in the composition is from about 15 to 40 percent of the total solids, but preferably from about 20 to 30 percent. Any aqueous film-forming latex of a polymer may be employed. Examples of such latexes are the various homopolymers and copolymers of acrylates, methacrylates, acrylamides, methacrylamides, acrylic acid, methacrylic acid, various copolymers of maleates and fumarates and of various N-substituted acrylamides such as N-methyl acrylamide and N-propyl acrylamide, polymers prepared using the amides and half amides of maleic, fumaric and itaconic acids, vinyl esters and ethers, etc. As is known in the art, some latexes will form films of unplasticized polymer, while others require a plasticizer to be film-forming.

To protect the coatings of the invention against thermal stress, the binder is suitably a flexible resin. The resin of the invention will possess elastomeric properties. Accordingly, the film-flexibilizing binder should be of a type and of a melting point to be readily deformable at the temperatures to which roof systems and the like are subjected, although the coating's plasticization may also be achieved or assisted by incorporating known plasticizers. The glass transition temperature (Tg) of the polymer is suitably low and is generally no greater than about 20° C., preferably 0° C. The binder comprises about 10 to 40, more preferably 15 to 35, most preferably 20 to 30, % by weight of the coating composition.

A preferred polymeric binder of the invention comprises an acrylic resin. The acrylic desirably has a low glass transition temperature, e.g., below 0° C., and is sufficiently plasticized to provide improved flexibility in the sealant. Especially preferred binders are self-plasticizing thermoplastic acrylic polymers characterized by a low Tg and excellent flexibility. The low Tg ($-50°$ C.) emulsion polymer with internal plasticizer supplied by Rohm and Haas Company under the trademark Rhoplex EC-1895 is an example of such a polymer. Coating compositions containing this polymer have highly desirable elongation and strength characteristics and good adhesion to the roof substrate, and accordingly their resistance to deterioration upon long-term exterior exposure is enhanced.

Another preferred resin of the invention comprises a halogen-bearing addition polymer, such as a halogenated vinyl resin. Coatings with halogenated vinyl polymers, especially vinylidene chloride copolymer latices, offer outstanding properties in severe environments, such as in protecting roofs. The uniquely low $O_2$ and $H_2O$ permeability rate and high chlorine content (contributing to flame retardance) of vinylidene chloride coatings are highly advantageous in roofing applications. These coatings can be formulated to give a combination of flame retardance, water resistance, film strength, chemical resistance, flexibility and adhesion.

Especially useful coating films, which are tough and flexible and adhere well to various substrates with very low water vapor permeability, and have improved weather resistance, contain vinyl acrylic copolymers. These preferred flame retardant coatings of the invention can be formed using as binder aqueous dispersions of copolymers of vinyl chloride, vinylidene chloride and acrylates, such as Haloflex 208 which is available from ICI Americas Inc. While Haloflex 208 may have a higher Tg and be less flexible than acrylic polymers produced without vinyl co-monomers, coatings made with the Haloflex binder still exhibit excellent adhesion for extended periods under ponded water as well as the exceptional fire retardant properties. Vinylidene chloride films are considerably stronger (200 vs. 400 psi tensile) and from 10 to 100 times less permeable than acrylic films. These characteristics help prevent the water and water vapors from entering the film on the roof surface on days of rain and/or very high humidity conditions, preserving strong adhesion to the substrate. The acrylic component provides the long term weatherability as well as a decrease in the Tg value imparting flexibility and elongation.

Practically any pigment and filler which may be employed in coating compositions of the prior art may also be employed in the improved coating of the present invention so long as the coating contains sufficient clay for enhanced adhesion. It is possible to use a wide variety of low cost materials such as mica, calcium carbonate, silicas, etc., known in the trade as filler or extenders, to replace a certain amount of the more expensive coloring materials known as pigments, such as titanium dioxide. While both types of material can be used, the word "pigment" will be used in the claims in order to generically define these two types of material.

While it is known in the art to employ various mineral fillers, such as mica and calcium carbonate in roof coating applications, it has not been recognized heretofore that vastly improved adhesion results are obtainable through the addition of clay to the coating composition in accordance with the present invention. The conventional coatings containing calcium carbonate and other fillers, by virtue of their particle size and distribution, develop a matrix and a rheology that contribute to loss of adhesion of the coating when under water. Clays, on the other hand, which are platy in nature and have small particle size, will pack closely together in the coating matrix to form a film having a strong adhesion to the substrate under water. Unlike those coatings of the present state of the art, such as for indoor wall and ceiling applications, wherein clays are sometimes used as cheap, low pH fillers and extenders, the coatings of the present invention utilize clay as a valuable aid to adhesion, which is particularly helpful in the conditions of long-term water ponding often found in the field.

The clay mineral component of the coating composition is a well-known material. Clay minerals are earthy or stony mineral aggregates consisting essentially of hydrous silicates of aluminum, iron and/or magnesium. Clay minerals may be amorphous and/or crystalline and may contain a variety of other (non-clay) minerals, such as quartz, calcite, feldspar and pyrites. Examples of these clay minerals are kaolinite, attapulgite, bentonite, montmorillonite, illite, pyrophillite, halloysite, hectorite, saponite, nontronite and beidellite. A variety of other clay minerals may be used in combination with the foregoing.

By using clay of small particle size as part of the filler component, a coating mixture having good compatibility and adhesiveness is achieved. The preferred clay fillers are those which have a mean particle size generally less than about 5 microns. It is also preferred to use calcined or heat treated clay from which water of hydration has been removed.

A preferred clay of the invention is kaolin. Kaolin clay describes several hydrated aluminosilicate minerals, generally of plate-like structure and comprising species: kaolinite, nacrite, halloysite, dikcite. Kaolinitic materials are described by the general formula $Al_2O_3 \cdot 2SiO_2 \cdot xH_2O$ in which x is usually 2. The bound water of the kaolinitic minerals is desirably removed through calcination before these minerals are employed in the present invention. Representative calcined kaolin clays are Snowtex 45 and Altowhite TE, available from Texas Industrial Minerals and Georgia Kaolin Co., respectively.

The clay modified "pigment" component of the present coating may include those materials conventionally used in water base coatings to provide opacity to the paint system. Such pigments may be divided into prime (or pigments promoting opacity in the system) and inert (or pigments of little hiding quality or opacity in the system) pigments. Prime pigments include titanium dioxide (rutile and anatase grades), titanium dioxide-barium sulfate, titanium dioxide-calcium sulfate, zinc sulfide, zinc oxide and the like, and combinations thereof. Useful inert (extender) pigments include mica, calcium carbonate, talc, diatomaceous silica, colloidal silica, amorphous silica, pyrophylite, barium sulfate, calcium sulfate, etc.

The amount of pigments (including clay) in the coating composition is in the range from about 20 to 60, more preferably 25 to 45, most preferably 30 to 40, % by weight of the total composition. The adhesion promoting clay component of the pigment generally comprises 1 to 25, more preferably 2 to 20, most preferably 3 to 18, % by weight of the total composition.

The preferred pigments are those which are finely divided, having an average particle size generally less than 200 microns (equivalent spherical diameter), and preferably less than 100 microns. The clay component typically has an average particle size of about 0.03 to about 10, more preferably about 0.3 to about 5, and most preferably about 0.5 to about 3, microns. In a preferred embodiment of the invention, a clay batch of a selected small average particle size is used in conjunction with one or more other clay batches of small average particle size to provide a gradient of particle sizes for enhanced adhesion to the substrate. For example, excellent results are obtained when the clay component comprises about 2 to 10% by weight calcined clay of 0.5 micron average particle size and about 2 to 10% by weight calcined clay of 2.2 microns average particle size. The standard definition of "equivalent spherical diameter" for particle size may be described as the diameter of a sphere having the same volume as that of the particle.

It also has been found advantageous for the pigments generally to have smaller average particle sizes (average spherical diameters) than conventional roof coating pigments. The smaller, non-clay pigments have average particle sizes preferably less than about 25 microns, more preferably less than about 15 microns, and most preferably less than about 8 microns.

Particularly suitable pigments are titanium dioxide, magnesium silicate (talc), calcined clay(s), and mica. The thin platy mica particles have been found especially useful in preventing cracking of the vinylidene chloride copolymer coatings in roofing applications. The coating composition generally contains in weight % from about 3 to 25, preferably 4 to 15, % of titanium dioxide (average particle size, for example, of 0.2 micron); about 5 to 30, preferably 10 to 25, % of talc (average particle size, for example, of 5.0 microns); about 1 to 25, preferably 2 to 20, % of calcined clay(s)—average particle size, for example, of less than 2 microns; and about 0 to 5, preferably 1 to 3, % of mica (average particle size, for example, of 15 microns).

A highly effective and economically attractive coating composition of the invention has a PVC of about 30–50, preferably about 35–45. The composition preferably contains 25 to 50, more preferably 35 to 45, % by weight of water and generally has a total solids content of from 50 to 75 weight percent.

In order to ensure effective coverage of the surface to be protected with a coherent film, it is preferred that the coating composition contain a surfactant. The surfactant may be any known type which is compatible with the other ingredients in the composition. The purposes of this invention are well served by using nonionic surface active agents which have a balance between hydrophobic and hydrophilic portions in the molecule for appropriate surface tension reduction of water-based coatings. The hydrophobic portion of the nonionic surfactant can be suitably structured to resist re-solubilization or re-emulsification when water comes in contact with the coating and hence to contribute to the strong adhesion of the coating to a substrate under water. Nonionics having a hydrophobic portion containing a minimum of eight carbon atoms are found to be especially useful for reducing the water sensitivity of the coating. One such group of nonionic additives are acetylenic glycols, such as 2,4,7,9 tetramethyl 5-decyn 4,7 diol, which is marketed commercially as SURFYNOL 104 surfactant by Air Products and Chemicals Inc. The superior surfactant properties of these acetylenic glycols can be related to their unusual molecular structure combining hydrophobic hydrocarbon segments with hydrophilic acetylenic linkages and hydroxyl groups. A suitable amount of surfactant is from about 0.1 to 0.3% by weight of the composition.

To obtain compositions of the desired consistency, any thickening agent compatible with the system may be added thereto. The thickener, which is advantageously included in an amount of about 0.2 to 1.5% by weight of the composition, improves its viscosity and flow properties and provides the necessary pigment suspension. The amount of such additive, when used, is generally selected to provide a viscosity in the composition of about 3000 to 7000 centipoises. The viscosity is measured at 24° C. with a Brookfield viscometer. Examples of thickening agents include bentonite clays, natural gums, polymers of acrylic acid and methacrylic acid, water-soluble cellulose ethers, such as methyl cellulose, ethyl cellulose, hydroxyethyl cellulose, carboxymethyl cellulose, and the like. The preferred clay minerals are those of the montmorillonite group, including beidellite, bentonite, hectorite, montmorillonite itself, nontronite and saponite. Most well known of the bentonite species are sodium bentonite, also known as Wyoming bentonite, and calcium bentonite, which is negligibly swellable but can be made more so by exchanging the calcium ions for sodium ions.

Advantageously, the bentonites are employed in the form of complexes resulting from a cation exchange reaction between an organic base and the clay mineral. The cation-modified bentonite complexes or salts are produced by the reaction of bentonite with organic bases or salts of organic bases through base exchange wherein the calcium, sodium, potassium, magnesium or other replaceable bases of the silicate of the bentonite enter into ionic exchange with cations of organic bases. Such bentonite complexes, e.g., Bentone LT, are manufactured by the National Lead Company. The replacement of inorganic cations of the clay mineral lattice with organic cations results in the development of a structure which forms a thixotropic gel with water by the edge-to-edge hydrogen bonding between the clay platelets. Unlike clay platelets which are hard and rigid, these platelets are soft and flexible. Use of a bentonite complex as gellant and thickener contributes to a good balance of rheological properties (sag and levelling), as well as non-settling and wet-edge control.

It has been found that the preferred thickener for a coating derived from a polymeric film former having the permeability of a typical acrylic is a non-cellulosic thickener such as Bentone LT. A cellulosic thickener tends to draw water through the film, which can cause blistering and loss of adhesion. When less permeable film formers, such as copolymers of vinyl chloride, vinylidene chloride and acrylates, are used, the choice of thickener is not of such importance, and accordingly any thickening agent compatible with the system may be used.

The aqueous coating composition desirably contains a dispersing agent for suitable dispersion of the pigment in the composition. From about 0.1 to 10.0% by weight of the dispersant is generally employed. Example of dispersants that may be used are the anionic types, e.g., the higher fatty alcohol sulfates, such as sodium lauryl sulfate, sulfonates, such as the sodium salt of t-octylphenyl sulfonate, the sodium dioctyl sulfosuccinates, etc., the sodium phosphates, such as sodium hexametaphsphate, and the nonionic types. Sodium hexametaphosphate exhibits a synergistic effect in combination with the preferred tetramethyl decyn diol, increasing the wetting action of the latter surfactant.

Any tendency of the composition of the invention to foam can be countered by mixing therewith known foam inhibitors, e.g., silicone oils, blends of petroleum derivatives, esters, and surface active agents in a small but effective amount, e.g., between about 0.001 and 0.5% by weight, based on the total weight of the composition.

Further auxiliary agents for use in the coating composition of the invention include preservatives, buffers, coloring agents, platicizers, fire retardants, coalescents, disinfectants, and stabilizers (e.g., an anti-freeze material).

In applying the coating composition of the invention, the surface, which may be wood; steel, iron, or other metal; masonry or other stone; or, in fact, any suitable surface to which the coating will adhere, is suitably prepared in order to clean it and provide suitable adherence.

Application of the coating to a suitably clean and dry building roof, which may be asphalt, modified bitumen, foam surfaces, e.g., urethane, steel, wood, cement, and so on, may be accomplished by conventional means, such as by brush, roller, squeezee or spray, and preferably is carried out by airless spray. The coating composition should be applied at air temperatures ranging between 50° F. and 100° F. It is further recommended that the composition be applied in two coats with complete drying between the coats. It is preferable to apply the coating over fresh asphalt—as fresh as one or two hours after hot mopping—rather than old asphalt. The total dry film thickness of the coating (e.g., with a PVC of about 36–41) should be about 5 to 40 mils, with the exact thickness depending upon the nature of the particular substrate—e.g., asphalt BUR roofs require between approximately 10 and 30 dry mils. Coating thicknesses of about 10 to 30 mils can be expected. Adequate coverage generally can be achieved by applying from about 1 to 4 gallons per 100 sq. ft. After application, the composition is allowed to dry in air to a finished roof coating.

The protective coating applied in accordance with the present invention displays exceptional adhesion to various roof surfaces (BUR, modified bitumen, sprayed urethane, etc.) even when said surfaces are under prolonged water submersion. The coating extends substantially the useful service life of the roof and maintains cooler building interiors by reflecting sunlight and heat, thus effecting significant energy savings. The preferred coating containing the vinyl resin binder renders the roof assembly fire retardant by providing a self-extinguishing, non-fire sustaining membrane.

The white, flexible and tough membrane of the invention adheres well to roof surfaces and remains adhered even under severe water ponding conditions. Poor adhesion to wet substrates, particularly wet asphalt, has been a problem and a definite limitation of current state of the art roof coatings. When the adhesion of these coatings is somewhat improved, this is accomplished at the expense of other important properties, such as elongation and weathering, or by exponentially increasing cost. Even then, adhesion under water is, at best, only fair to poor. The present invention solves this problem by giving adhesion to asphalt, and other substrates, which is excellent even after a month-long continuous water immersion.

The present invention is further illustrated by the following examples in which all percentages are by weight, unless otherwise indicated.

EXAMPLE 1

This example illustrates the preparation of a typical coating composition containing the ingredients listed in the following Table I.

TABLE I

| Ingredient | Percentage |
| --- | --- |
| Water | 22.16 |
| Bentone LT[1] | 0.44 |
| Defoamer[2] | 0.25 |
| Ethylene Glycol | 1.65 |
| Sodium Hexametaphosphate (dispersant) | 0.12 |
| Titanium Dioxide (rutile) | 6.65 |
| Magnesium Silicate | 13.31 |
| Calcined Clay[3] | 8.87 |
| Calcined Clay[4] | 7.76 |
| Acrylic Emulsion[5] | 37.29 |
| Preservative 1[6] | 0.27 |
| Coalescent (ester alcohol) | 0.88 |
| 2,4,7,9 Tetramethyl 5-decyn 4,7 diol | 0.26 |
| Preservative 2[6] | 0.09 |
| | 100.00 |

[1]A bentonite clay supplied by National Lead Co.
[2]Supplied by Diamond Shamrock Corp. under the trade name Nopco NXZ.
[3]Supplied by Texas Industrial Minerals Co. under the trade name Snowtex 45.
[4]Supplied by Georgia Kaolin Co. under the trade name Altowhite TE.
[5]Supplied by Rohm and Haas Co. under the trade name Rhoplex EC-1895.
[6]Supplied by Troy Chemical Corp. under the trade names Polyphase AF-1 and Troysan 174, respectively.

The ingredients were combined with mixing in the general order listed in Table I, except that a portion of the acrylic emulsion was introduced after the dispersant and a portion of the defoamer was held out for later addition after the remaining acrylic emulsion. The coating composition was evaluated with the following results:

| Property | Test Result |
| --- | --- |
| % Solids by weight | 59.0–61.0 |
| Density (lbs./gal.) | 11.0–11.5 |
| Viscosity (cps) | 4000–7000 |
| % Solids by volume | 45.0–47.0 |
| PVC | 38–41 |

EXAMPLE 2

Another coating composition of the invention was prepared containing the ingredients listed in the following Table II.

TABLE II

| Ingredient | Percentage |
| --- | --- |
| Water | 15.70 |
| Ethylene Glycol | 1.56 |
| Defoamer[1] | 0.24 |
| Pluronic F-87[2] | 0.55 |
| Hydroxyethyl Cellulose | 0.30 |
| Sodium Hexametaphosphate (dispersant) | 0.13 |
| Vinyl Acrylic Copolymer Latex[3] | 46.30 |
| NH4OH | 0.26 |
| Titanium Dioxide (rutile) | 6.38 |
| Magnesium Silicate | 21.25 |
| Calcined Clay[4] | 3.19 |
| 4K Mica | 2.12 |
| Preservative 1[5] | .26 |
| Coalescent (ester alcohol) | 1.67 |
| 2,4,7,9 Tetramethyl 5-decyn 4,7 diol | 0.22 |
| Preservative 2[5] | .08 |
| | 100.00 |

[1]Supplied by Diamond Shamrock Corp. under the trade name Nopco NXZ.
[2]A polyoxypropylene-polyoxyethylene copolymer supplied by BASF Wyandotte Chemical Corp.
[3]Supplied by ICI Americas Inc. under the trade name Haloflex 208.
[4]Supplied by Georgia Kaolin Co. under the trade name Altowhite TE.
[5]Supplied by Troy Chemical Corp. under the trade names Polyphase AF-1 and Troysan 174, respectively.

The ingredients were combined with mixing in the general order listed in Table 2, except that portions of the vinyl acrylic copolymer latex, NH4OH and defoamer were held out for later addition after the mica.

The coating composition was evaluated with the following results:

| Property | Test Results |
| --- | --- |
| % Solids by weight | 60.0–61.0 |
| Density (lbs./gal.) | 11.0–11.5 |
| Viscosity (cps) | 4000–7000 |
| % Solids by volume | 44.0–47.0 |
| PVC | 36–39 |

Whereas the present invention has been described with respect to specific embodiments thereof, it should be understood that the invention is not limited thereto as many modifications thereof may be made. It is, therefore, contemplated to cover by the present application any and all such modifications as fall within the true spirit and scope of the appended claims.

We claim:

1. A process of forming a durable waterproof coating on the exterior surface of a substrate for protection against water ponding and long-term weathering comprising (a) applying to the surface of the substrate an aqueous dispersion comprising at least one synthetic film-forming polymer, pigment material including kaolin clay, the kaolin clay being present in an amount sufficient to improve the adhesion of the coating to the substrate and the pigment material having an average particle size less than 200 microns, and water, the pigment volume concentration of the dispersion being greater than 15%, and (b) allowing the dispersion to dry on the surface.

2. The process of claim 1 wherein the substrate comprises a roof substrate selected from the group consisting of asphalt, modified bitumen, and plastic foam.

3. The process of claim 1 wherein the pigment volume concentration of the dispersion is greater than 25%.

4. The process of claim 3 wherein the substrate comprises a wall or roof substrate of a building.

5. The process of claim 3 wherein the substrate comprises a roof substrate of a building and the polymer is a member selected from the group consisting of an acrylic polymer, a halogenated vinyl polymer and mixtures thereof.

6. The process of claim 5 wherein the polymer is a member selected from the group consisting of acrylic polymers produced without vinyl chloride and vinylidene chloride co-monomers and having a Tg of about 0° C. or less; copolymers of vinyl chloride, vinylidene chloride and acrylates; and mixtures thereof, the polymer being sufficiently flexible to provide prolonged resistance of the coating to deterioration upon long-term exterior exposure.

7. The process of claim 5 wherein the pigment material is a member selected form the group consisting of titanium dioxide, calcium carbonate, silica, mica, kaolin clay, talc and mixtures thereof.

8. The process of claim 5 wherein the dispersion additionally contains an effective amount of at least one component selected form the group consisting of a thickening agent, a defoamer, a nonionic surfactant, a dispersing agent, and anti-freeze stabilizer, a preservative, a coalescent, a pH stabilizer and mixtures thereof.

9. The process of claim 8 wherein the dispersion comprises about 10 to 40% by weight of the polymer, about 20 to 60% by weight of the pigment material, the pigment material including about 1 to 25% by weight of koalin clay, and about 25 to 50% by weight of water.

10. The process of claim 5 wherein the polymer is a member selected from the group consisting of acrylic polymers produced without vinyl chloride and vinylidene chloride co-monomers and having a Tg of about 0° C. or less; copolymers of vinyl chloride, vinylidene chloride and acrylates, and mixtures thereof, the polymer being sufficiently flexible to provide prolonger resistance of the coating to deterioration upon long-term exterior exposure; the pigment material is a member selected from the group consisting of titanium dioxide, kaolin clay, mica, talc and mixtures thereof; and the dispersion additionally contains an effective amount of at least one component selected from the group consisting of a thickening agent, a defoamer, a nonionic surfactant, a dispersing agent, and anti-freeze stabilizer, a preservative, a coalescent, a pH stabilizer and mixtures thereof.

11. The process of claim 10 wherein the pigment material comprises from about 3 to 25% by weight of titanium dioxide, 5 to 30% by weight of talc, 1 to 25% by weight of kaolin clay and 0 to 5% by weight of mica; the thickening agent is a member selected from the group consisting of a cation-modified bentonite clay, a water-soluble cellulose ether and mixtures thereof; the nonionic surfactant is a member selected from the group consisting of 2,4,7,9-tetramethyl 5-decyn 4,7 diol, a polyoxypropylene-polyoxyethylene copolymer and mixtures thereof; the dispersing agent is sodium hexamethaphosphate; and the pigment volume concentration of the dispersion is from about 30 to 50%.

12. The process of claim 11 wherein the roof substrate comprises freshly applied hot-mopped asphalt.

13. An aqueous composition for application to the exterior surface of a substrate to form a durable waterproof coating on the substrate for protection against water ponding and long-term weathering comprising at least one synthetic film-forming polymer, pigment material including kaolin clay, the kaolin clay being present in an amount sufficient to improve the adhesion of the coating to the substrate and the pigment material having an average particle size less than 200 microns, and water, the pigment volume concentration of the composition being greater than 25%.

14. The composition of claim 13 wherein the polymer is a member selected from the group consisting of an acrylic polymer, a halogenated vinyl polymer and mixtures thereof.

15. The composition of claim 14 wherein the pigment material is a member selected from the group consisting of titanium dioxide, kaolin clay, mica, talc and mixtures thereof.

16. The composition of claim 15 wherein the polymer is a member selected from the group consisting of acrylic polymers produced without vinyl chloride and vinylidene chloride co-monomers and having a Tg of about 0° C. or less; copolymers of vinyl chloride, vinylidene chloride and acrylates; and mixtures thereof, the polymer being sufficiently flexible to provide prolonged resistance of the coating to deteriorate upon long-term exterior exposure.

17. The composition of claim 16 wherein the composition additionally contains an effective amount of at least one component selected from the group consisting of a thickening agent, a defoamer, a nonionic surfactant, a dispersing agent, and anti-freeze stabilizer, a preservative, a coalescent, a pH stabilizer and mixtures thereof.

18. The composition of claim 17 wherein the composition comprises about 10 to 40% by weight of the polymer, about 20 to 60% by weight of the pigment material, the pigment material including about 1 to 25% by weight of kaolin clay, and about 25 to 50% by weight of water.

19. The composition of claim 17 wherein the pigment material comprises from about 3 to 25% by weight of titanium dioxide, 5 to 30% by weight of talc, 1 to 25% by weight of kaolin clay and 0 to 5% by weight of mica; the thickening agent is a member selected from the group consisting of a cation-modified bentonite clay, a water-soluble cellulose ether and mixtures there-of; the nonionic surfactant is a member selected from the group consisting of 2,4,7,9-tetramethyl 5-decyn 4,7 diol, and a polyoxypropylene-polyoxyethylene copolymer and mixtures thereof; the dispersing agent is sodium hexameaphosphate; and the pigment volume concentration of the dispersion is from about 30 to 50%.

20. In combination with a roof substrate, a thin surfacing layer affixed directly to the exterior surface of the substrate for protection against water ponding and long-term weathering and comprising pigment material and at least one synthetic film-forming polymer binder, the pigment material including kaolin clay, the kaolin clay being present in an amount sufficient to improve the adhesion of the layer to the substrate, the pigment material having an average particle size less than 200 microns and the pigment volume concentration of the layer being greater than 15%.

* * * * *